(12) United States Patent
Shia

(10) Patent No.: US 9,871,667 B2
(45) Date of Patent: Jan. 16, 2018

(54) INTERACTION PROTOCOL FOR INTERACTING COMPUTER SYSTEMS

(71) Applicant: So-Ming Daniel Shia, San Francisco, CA (US)

(72) Inventor: So-Ming Daniel Shia, San Francisco, CA (US)

(*) Notice: Subject to any disclaimer, the term of this patent is extended or adjusted under 35 U.S.C. 154(b) by 478 days.

(21) Appl. No.: 14/591,869

(22) Filed: Jan. 7, 2015

(65) Prior Publication Data

US 2015/0193105 A1 Jul. 9, 2015

(30) Foreign Application Priority Data

Jan. 8, 2014 (CN) .......................... 2014 1 0009179

(51) Int. Cl.
*G06F 15/16* (2006.01)
*G06F 15/173* (2006.01)
(Continued)

(52) U.S. Cl.
CPC ............ *H04L 12/1822* (2013.01); *G06F 8/36* (2013.01)

(58) Field of Classification Search
CPC ... H04L 63/0428; H04L 63/08; H04L 69/329; H04L 12/1822; H04L 67/22; H04L 67/02;
(Continued)

(56) References Cited

U.S. PATENT DOCUMENTS 8,898,708 B2* 11/2014 Rao .................. G06Q 30/02
725/74
8,909,202 B2* 12/2014 Luna .................. H04W 24/04
455/405
(Continued)

OTHER PUBLICATIONS

Canepa et al., Self-stabilizing tiny interaction protocols, Jul. 2010, 6 pages.*
(Continued)

*Primary Examiner* — Thuy Dao
(74) *Attorney, Agent, or Firm* — Brian N. Young; Fountainhead Law Group P.C.

(57) ABSTRACT

In one embodiment, a method generates interaction skeletons for a plurality of participating computers to interoperate based on a multi-party interaction protocol. The method includes creating an Interaction Protocol based on an interaction process of how the plurality of participating computers interact with each other. The Interaction Protocol uses multiple Interaction Activities and multiple Transition Relations to describe the interaction process among the plurality of participating computers. The method then determines an interaction skeleton by generating multiple Participating Activities and their Transition Relations for each participating computer in the plurality of participating computers based on corresponding Interaction Activities and their Transition Relations in the Interaction Protocol. The interaction skeleton is converted into executable interaction modules. One of the interaction modules is loaded into each participating computer in the plurality of participating computers, and the plurality of participating computers use the interaction module to communicate messages.

23 Claims, 13 Drawing Sheets

(51) Int. Cl.
*H04L 29/08* (2006.01)
*H04L 29/06* (2006.01)
*H04L 12/18* (2006.01)
*G06F 9/44* (2006.01)

(58) Field of Classification Search
CPC .......... G06F 13/387; G06F 9/546; G06F 8/36; G06Q 30/02; G06Q 30/10
See application file for complete search history.

(56) References Cited

U.S. PATENT DOCUMENTS

| | | | |
|---|---|---|---|
| 8,943,151 B2* | 1/2015 | Smith | G06Q 10/107 455/456.3 |
| 9,059,966 B2* | 6/2015 | Agarwal | H04L 63/0281 |
| 2003/0140129 A1* | 7/2003 | Livnat | H04L 29/06 709/221 |
| 2009/0215476 A1* | 8/2009 | Tysowski | H04L 51/04 455/466 |
| 2013/0055198 A1* | 2/2013 | Weigert | G06F 8/10 717/106 |
| 2013/0073473 A1* | 3/2013 | Heath | G06Q 30/02 705/319 |
| 2015/0326453 A1* | 11/2015 | Bishop | H04L 67/02 709/224 |

OTHER PUBLICATIONS

Lai et al., A RF4CE-based remote controller with interactive graphical user interface applied to home automation system, Feb. 2013, 19 pages.*

* cited by examiner

```
// simple Interaction Activity
struct Simp_Proto   {
   String     message;
   String     from;
   String     to;
};
// composite Interaction Activity
struct Comp_Proto   {
   struct Phase   {
      struct Trans { // Transition Relation
         int     (*transPred) ( );   // Transition Condition predicate
         int   target :  //  indext to Phase[ ]
      } trans [MAX_TRANS] ;
      struct  Proto    *protoP;  //   point to a sub-Interaction Protocol
   } phase [MAX_PHASE] ;
};
// Interaction Protocol can be simple or composite Interaction Activity
struct  Proto  {
    int   pick;
    union  {
       struct Comp_Proto comp_proto;
       struct Simp_Proto simp_proto;
    } u ;
};
```

FIG. 9

```
// simple Participating Activity
struct Simp_DS  {
    int    (*behavior) ( ) ;
} ;
// behavior can be one of the following 3 types
int    (*send) ( ) ;  //  Sending Participating Activity
int    (*receive) ( ) ;  //  Receiving Participating Activity
int    (*empty) ( ) ;  //  empty Participating Activity
// composite Participating Activity
struct Comp_DS {
    struct Trans  {
        int    (*transPred) ( ) ;
        int target; / *  indext to Phase [ ]    * /
    }trans [MAX_TRANS] ;
    struct DS       *dsp;  //  point to a simple or composite sub-sys
  } phase [MAX_PHASE] ;
} ;
// Participating System can be a simple or composite DS
struct DS {
   int    pick;
   union  {
       struct Comp_DS comp_ds ;
       struct Simp_DS simp_ds ;
   } u ;
} ;
```

*FIG. 10*

```
// Implementing Transition Relation structure independent of an
// Activity structure struct Trans  { //  Transition Relation
     int    (*transPred) ( ) ; // Transition Condition predicate
     int    source; //  index to source phase
     int    target;  //   index to target phase
} trans [MAX_TRANS] ;
```

FIG. 17

INTERACTION PROTOCOL FOR INTERACTING COMPUTER SYSTEMS

CROSS REFERENCE TO RELATED APPLICATIONS

The present disclosure claims priority to China Provisional App. No. 201410009179.7, entitled "A method for generating interaction skeleton in a software system based on a multi-party interaction protocol", filed Jan. 8, 2014, the contents of which is incorporated herein by reference in its entirety.

BACKGROUND

Conventional modeling has problems in describing multi-party interactions. There are two main problems:

The first problem is that it requires creating a large amount of messages in various patterns. There is a high risk of missing an interaction in such a multi-party interaction environment.

The second problem is that a highly complex software system typically contains multiple sub-systems at various levels that need to interact with external systems, and these software systems and their sub-systems typically are developed and maintained by different development teams. It is very difficult for these development teams to communicate effectively with each other about the complex interactions. In particular, it is hard to ensure the accuracy and completeness for software systems to handle these interactions.

For these two reasons, conventional ways for modeling and developing multiple interacting software systems are very difficult and inefficient.

SUMMARY

In one embodiment, a method generates interaction skeletons for a plurality of participating computers to inter-operate based on a multi-party interaction protocol. The method includes creating an Interaction Protocol based on an interaction process of how the plurality of participating computers interact with each other. The Interaction Protocol uses multiple Interaction Activities and multiple Transition Relations to describe the interaction process among the plurality of participating computers. The method then determines an interaction skeleton by generating multiple Participating Activities and their Transition Relations for each participating computer in the plurality of participating computers based on corresponding Interaction Activities and their Transition Relations in the Interaction Protocol. The interaction skeleton is converted into executable interaction modules. One of the interaction modules is loaded into each participating computer in the plurality of participating computers, and the plurality of participating computers use the interaction module to communicate messages.

In one embodiment, a non-transitory computer-readable storage medium contains instructions for generating interaction skeletons for a plurality of participating computers to inter-operate based on a multi-party interaction protocol. The instructions, when executed, control a computer system to be configured for: creating an Interaction Protocol based on an interaction process of how the plurality of participating computers interact with each other, wherein the Interaction Protocol uses multiple Interaction Activities and multiple Transition Relations to describe the interaction process among the plurality of participating computers; determining an interaction skeleton by generating multiple Participating Activities and their Transition Relations for each participating computer in the plurality of participating computers based on corresponding Interaction Activities and their Transition Relations in the Interaction Protocol; and converting the interaction skeleton into executable interaction modules, wherein one of the interaction modules is loaded into each participating computer in the plurality of participating computers, and wherein the plurality of participating computers use the interaction module to communicate messages.

In one embodiment, an apparatus generates interaction skeletons for a plurality of participating computers to inter-operate based on a multi-party interaction protocol. The apparatus includes: one or more computer processors; and a non-transitory computer-readable storage medium comprising instructions, that when executed, control the one or more computer processors to be configured for: creating an Interaction Protocol based on an interaction process of how the plurality of participating computers interact with each other, wherein the Interaction Protocol uses multiple Interaction Activities and multiple Transition Relations to describe the interaction process among the plurality of participating computers; determining an interaction skeleton by generating multiple Participating Activities and their Transition Relations for each participating computer in the plurality of participating computers based on corresponding Interaction Activities and their Transition Relations in the Interaction Protocol; and converting the interaction skeleton into executable interaction modules, wherein one of the interaction modules is loaded into each participating computer in the plurality of participating computers, and wherein the plurality of participating computers use the interaction module to communicate messages.

The following detailed description and accompanying drawings provide a better understanding of the nature and advantages of particular embodiments.

BRIEF DESCRIPTION OF THE DRAWINGS

FIG. 9 is a definition of Interaction Protocol, simple Interaction Activity and composite Interaction Activity.

FIG. 10 is a definition of simple Participating Activity, composite Participating Activity and Participating Activity.

FIG. 17 shows the second way to implement Transition Relation.

DETAILED DESCRIPTION

Described herein are techniques for a system to model and design multiple interacting software systems. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments reduce the complexity for modeling and designing multiple interacting software systems and improve the efficiency for development and design of such software systems. Particular embodiments provide a way to automatically generate an interaction skeleton in multiple software systems that interact with each other based on a multi-party Interaction Protocol. Specifically, particular embodiments describe a method to achieve this goal, but other methods may be appreciated. The method ensures that these participating software systems can inter-operate with each other correctly.

Figure 1A:
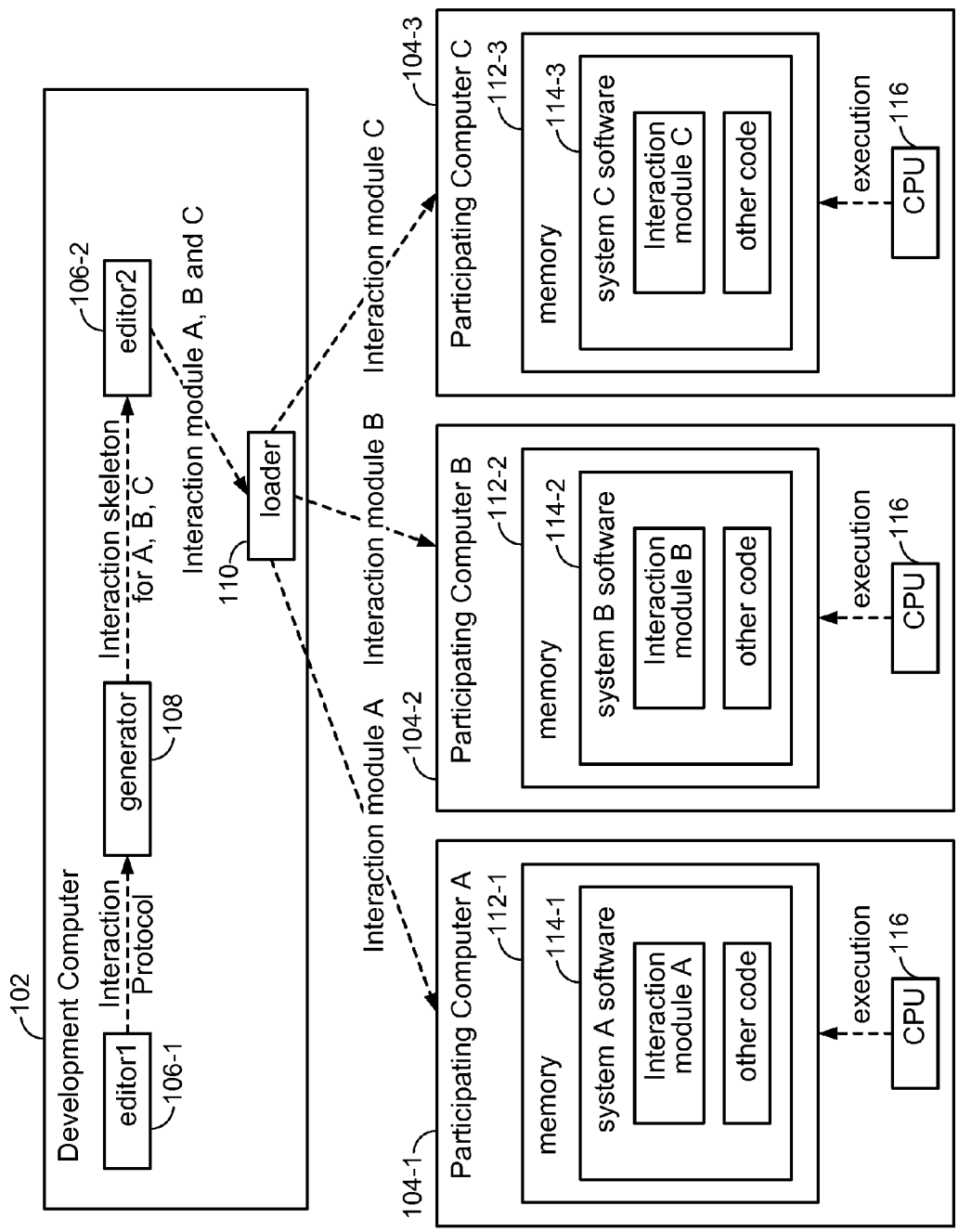
FIG. 1A describes a system for modeling and designing multiple interacting software systems according to one embodiment.

FIG. 1A describes a distributed computing environment for modeling and designing multiple interacting software systems according to one embodiment. FIG. 1A includes a development computer 102 and participating computer A 104-1, computer B 104-2, and computer C 104-3. Two or more participating computers may be provided in such a distributed computing environment.

In development computer 102, an editor1 106-1 is an editor application that allows a designer to create an interaction protocol. The interaction protocol provides one or more valid sequences of messages that can be sent from one participating computer to another.

A generator 108 receives the interaction protocol and can generate interaction skeletons for each participating computer 104 that are going to interact with each other. For example, generator 108 may generate interaction skeletons A, B, and C for participating computers A, B, and C, respectively. The interaction skeleton contains information, such as a set of pseudo code, that describes what actions that need to take place by a participating computer in order to send or receive messages as defined in the interaction protocol. Since the generator does not have all the knowledge about exactly how an outgoing message is to be constructed and sent out or how an incoming message is to be received and used by the participating computer, the pseudo code in the generated interaction skeleton is not fully executable by the participating computer yet. This generated interaction skeleton may be further refined into interaction modules by a designer in order for it to be fully executable by the participating computer.

After generating the interaction skeletons, an editor2 106-2 allows a designer to change the pseudo code in the interaction skeletons into interaction modules that contain actual executable code, which enables messages to be sent or received in between participating computers 104. This step creates fully executable interaction modules that can be executed by participating computers 104 based on generated pseudo code in the interaction skeleton.

A loader 110 receives the interaction modules and can then load them into participating computers A, B, and C, respectively. Each participating computer may receive a different interaction module depending on the participating computer's role in the interaction. Without loading these interaction modules, these participating computers cannot send and receive messages to each other in a collaboration correctly in order to achieve some collective computation goals. However, with these interaction modules loaded, these participating computers can interact with each other correctly so that a collective of computation goal can be achieved by following the interaction modules.

Each participating computer A, B, and C includes a memory 112-1, 112-2, and 112-3, respectively. Each memory 112-1, 112-2, and 112-3 includes system A software 114-1, system B software 114-2, and system C software 114-3, respectively. System software may be an operating system or other software that can be executed by a computer processing unit 116 of the respective participating computer. System A software 114-1, system B software 114-2, and system C software 114-3 store the respective interaction modules A, B, and C, respectively.

The method for generating an interaction skeleton in software systems includes: first, editor1 106-1 defines an Interaction Protocol to specify how multiple systems interact with each other. This Interaction Protocol divides the interaction into multiple Interaction Activities and multiple Transition Relations in order to completely describe the interaction between two participating computers 104 or among more than two participating computers 104.

An Interaction Activity describes one or more interactions in between two or more participating computers 104. The Interaction Activity has two types. They are simple Interaction Activity and composite Interaction Activity. A simple Interaction Activity describes one interaction in between two or more participating computers 104, whereas a composite Interaction Activity contains two or more subordinate simple or composite Interaction Activities and possible Transition Relations among these subordinate activities.

A participating computer 104 may play one of following roles in an Interaction Activity. If the participating computer 104 sends out the message defined in an Interaction Activity, it plays a sending role. If the participating computer 104 receives the message defined in an Interaction Activity, it plays a receiving role. If the participating computer 104 is not involved in an Interaction Activity, it does not play a role.

Then, generator 108 traverses all Interaction Activities in the Interaction Protocol, and generates an Interaction Skeleton with corresponding Participating Activities and their Transition Relations in a participating computer 104; in addition, empty Participating Activities can be simplified.

A Participating Activity is the activity one participating computer 104 interacts once or multiple times with other participating computers 104. These Participating Activities have two types. One is simple Participating Activity, and the other is composite Participating Activity. A simple Participating Activity describes one message exchange with other participating computers 104, whereas a composite Participating Activity includes two or more simple Participating Activities or composite Participating Activities and possible Transition Relations among these Participating Activities.

A simple Participating Activity has three types. If the participating computer 104 sends out a message in a simple Participating Activity, the corresponding Participating Activity in the participating computer 104 is a Sending Participating Activity, also called a Sending Activity. If the participating computer 104 receives a message in a simple Participating Activity, the corresponding Participating Activity in the participating computer 104 is a Receiving Participating Activity, also called a Receiving Activity. If the participating computer 104 does not send or receive a message in a simple Participating Activity, the corresponding Participating Activity is an empty Participating Activity in the participating computer 104, also called an empty Activity. It may be required that a participating computer 104 needs to participate in at least one Participating Activity in an Interaction Protocol, but that participating computer 104 does not need to participate in all Participating Activities in the Interaction Protocol.

A method generates an interaction skeleton for software systems, called participating computers 104, to inter-operate based on a multi-party interaction protocol: This method describes multi-party interactions in an Interaction-protocol, and then an interaction skeleton in each participating computers 104 is generated. The procedure is as follows:

In a step 1, editor1 106-1 creates an Interaction Protocol based on the interaction process of how multiple Participating systems interact with each other. The Interaction Protocol uses multiple Interaction Activities and multiple Transition Relations to completely describe the interaction process among these participating computers 104;

In a step 2, generator 108 generates multiple Participating Activities and their Transition Relations for each participating computer 104 in the interaction skeleton based on corresponding Interaction Activities and their Transition Relations in the Interaction Protocol, specifically, Participating Activities are generated by doing following steps for each Interaction Activity:

In a step 2.1, generator 108 finds the first Interaction Activity, and makes this Interaction Activity the Current Activity.

In a step 2.2, generator 108 generates a Participating Activity based on the type of the Current Activity and the role the participating computer 104 plays in the Current Activity. If the Current Activity is a Composite Interaction Activity, generator 108 generates a Composite Participating Activity. If the Current Activity is a Simple Interaction Activity, generator 108 generates a Simple Participating Activity depending on which role the participating computer 104 plays in the Current Activity. If the participating computer 104 is a message sending party in a Current Activity, generator 108 generates a Sending Participating Activity in the participating computer 104 (e.g., in the interaction skeleton). Else, if the participating computer 104 is a message receiving party in the Current Activity, generator 108 generates a Receiving Participating Activity in the participating computer 104. Else, the participating computer 104 is not involved in the Current Activity, generator 108 generates an empty Participating Activity.

In a step 2.3, generator 108 finds the next Interaction Activity. If the next Interaction Activity is found, generator 108 uses that Interaction Activity as the Current Activity and performs step 2.2. If not, all Participating Activities have been generated.

In the method described here, the participating computers are those systems that participate in the multi-party interaction. In particular, these systems are typically software systems. Each of these participating computers 104 must participate in at least one Interaction Activity in the Inter-action Protocol. In addition, any participating computer 104 is not required to participate in all Interaction Activities. Therefore, a participating computer 104 contains at least one Participating Activity.

A simple Participating Activity can be defined in a software programming language similar to the Simp_DS data structure in FIG. 10, where a simple Participating Activity includes a behavior function, which can be defined as int (*behavior)( ), or int (*behavior)(void*).

Refinement of implementation in software can be done according to the three types of simple Participating Activities. If the Participating Activity is a Sending Participating Activity, its behavior function in software can be refined into a send function; if the Participating Activity is a Receiving Participating Activity, its behavior function in software can be refined into a receive function; if the Participating Activity is an empty Participating Activity, its behavior function in software can be refined into an empty function.

A composite Participating Activity can be defined in a software programming language similar to the Comp_DS data structure in FIG. 10, where a composite Participating Activity includes multiple Phase data structures. Each Phase data structure includes a Participating Activity and its Transition Relations defined as multiple Trans data structures with that Participating Activity as the source. Each Trans data structure defines a Transition Relation for the Participating Activity including a Transition Condition predicate function, transPred( ), and a reference to a target activity. The Transition Condition is used to determine whether the associated target Activity is the next one to start or not. If the Transition Condition is evaluated to be true, its associated target Activity is the next one to start. Else, its associated target Activity is not the next one to start. The multiple Phase data structures in the composite Participating Activity can be implemented in software as an array or a linked list. FIG. 10 only provides one possible implementation in software. Those multiple Trans data structures in a Phase data structure can also be implemented as an array or a linked list. In addition, the reference for a target activity in a Trans data structure can be implemented in software as an identifier number for the target activity or a pointer to the target activity.

A Participating Activity can be basically defined as the DS data structure in FIG. 10 where a simple Participating Activity and a composite Participating Activity are defined in a union with "pick" as an indicator indicating whether the Participating Activity is simple or composite.

A simple Interaction Activity can be basically defined in a software programming language similar to the Simp_Proto data structure in FIG. 9. Simp_Proto includes "message" that describes the message exchanged in between participating computers 104, "from" that refers to the sending participating computer 104, and "to" that refers to the receiving participating computer 104.

A composite Interaction Activity can be defined in a software programming language similar to the Comp_Proto data structure in FIG. 9. Comp_Proto includes multiple Phase data structures. Each Phase data structure includes an Interaction Activity and multiple Trans data structures, all of which have this Interaction Activity as their source. Each Trans data structure includes transPred( ), which is a predicate function that describes a Transition Condition, and target, which can be used as a reference for a target Activity. The Transition Condition is used to determine whether the associated target Activity is the next one to become active or not. If the Transition Condition is evaluated to be true, its associated target Activity is the next one to become active. Else, its associated target Activity is not the next one to become active.

Those multiple Phase data structures in a Composite Interaction Activity can be implemented as an array or a linked list, etc. FIG. 9 only provides one way for implementing it in software. The multiple Trans data structures can be implemented as an array or a linked list, etc. The way to refer to a target activity in each Trans data structure can be implemented as an identifier number or a pointer.

An Interaction Activity can be basically defined as the Proto data structure in FIG. 9. A Proto data structure includes a union of either simple Interaction Activity or composite Interaction Activity, and pick that is an indicator for indicating whether simple Interaction Activity or composite Interaction Activity is picked.

An Interaction Protocol can also be defined in a software programming language similar to the Proto data structure in FIG. 9, which is the same as an Interaction Activity.

In the method described here, the activity has two types. One is Interaction Activity and the other is Participating Activity. The Transition Relation describes the sequential execution order between two Interaction Activities or two Participating Activities. The preceding Interaction Activity or Participating Activity in a Transition Relation is called a source Activity, and the following Interaction Activity or Participating Activity in a Transition Relation is called a target Activity. A Transition Relation includes one source Activity and one target Activity. A Transition Relation supports whether a transition to the target Activity is conditional or unconditional using the Transition Condition predicate function. The Transition Relation can be implemented as part of the Activity data structure or independent from the Activity data structure. Those Transition Relations in FIGS. 9 and 10 are implemented as part of the source Activity data structure, which implies that the containing Activity is the source of each Transition Relation. If a Transition Relation is defined independently from the source Activity, it needs to include ways to refer to both a source and a target Activity as shown in FIG. 17.

In the method described here, there may be two implementation approaches for generating corresponding Participating Activity data structures in the participating computer 104. One is conversion and the other is replication. The conversion approach is to convert directly from each Interaction Activity in the Interaction Protocol into a Participating Activity data structure, which can be send, receive or empty functions, in said participating computer 104 based on the role, which can be sending, receiving or not involved, said participating computer 104 plays in the Interaction Activity. The replication approach is to copy all Interaction Activities for participating computer as Participating Activities data structures, and convert them to send, receive or empty functions.

In the method described here step 2, there may be two implementation approaches for generating Transition Relations in each participating computer 104. One is to generate all Participating Activity data structures and then generate Transition Relation data structures among them. The other is to generate one Participating Activity data structure and generate all its Transition Relation data structures before proceeding to the next Activity and repeat. If a target in a Transition Relation has not been generated yet, the generation of this Transition Relation data structures is delayed until that target is generated.

In the method described here, each empty Participating Activity can be removed from the resulting interaction skeleton. Specifically, after generating all Participating Activities and their Transition Relations in the participating computer 104, generator 108 checks each of these Participating Activities, if a Participating Activity is empty, generator 108 deletes the empty Participating Activity and replaces each Transition Relation that links from the source of the empty Participating Activity to the empty Participating Activity with new Transition Relations linking from the source to all targets of the empty Participating Activity.

The method described here can automatically generate interaction skeletons for participating software systems. Then, developers or users can add other internal activities for each participating computer 104.

Particular embodiments provide a way to define an abstraction, namely the Interaction Protocol, for interactions among multiple interacting computers. An Interaction Protocol can specify one or more Interaction Activities that describe the entire interaction process among multiple systems. Then, generator 108 generates an interaction skeleton in each software system automatically. By automatically generating interaction skeletons in the form of data structures, which can be based on by designers to further define executable modules that can be loaded into participating computers, the functionality of the participating computers can be improved in a way that allows them to send and receive messages without errors. When any change to interactions among participating computers is required, only the Interaction Protocol needs to be changed and then generator 108 generates new interaction skeletons for each participating computer. Designers can modify the executable interaction modules based on the generated interaction skeleton, therefore, eliminating the possibility that modified interaction modules in different participating computers may not inter-operate with each other correctly. Since each participating computer is typically developed by different designers, changes made to the interaction requirement often cause inconsistent behavior among revised interaction modules in various participating computers if this step is done without an intermediate interaction skeleton automatically generated from the changed requirement.

Particular embodiments can effectively reduce the difficulty when modeling multi-party interactions in an interaction protocol and increase the productivity of design and development of participating computers that need to interact with each other. In particular, when multiple development teams are required to build a large complex software system, particular embodiments can ensure that each participating system can inter-operate with other systems correctly. Without using the interaction protocol to mechanically generate interaction skeleton, the communication capabilities of computers can be error-prone.

In order to better understand the technical details, unique features and benefits of particular embodiments, some example embodiments and their associated diagrams are described below:

Example Embodiment 1

Figure 1B:
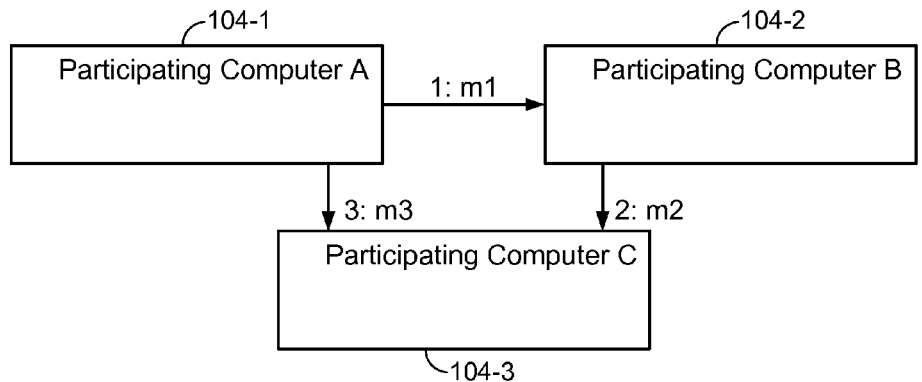
FIG. 1B shows interactions among multiple participating computers (A, B, C) in example embodiment 1.

As shown in FIG. 1B, three participating computers 104-1, 104-2, and 104-3 are loaded with their corresponding system software and interaction modules. Participating computers A, B and C, interact with each other using the interaction modules. Firstly, A sends an "m1" message to B; secondly, after B receives "m1", B sends a "m2" message to C; and then A sends a "m3" message to C.

Using the conventional style of FIG. 1B to describe interactions has a major problem. When the number of participating computers and messages needed to be exchanged among them become large, it would be very difficult to describe them clearly using the style of FIG. 1B.

Figure 2:
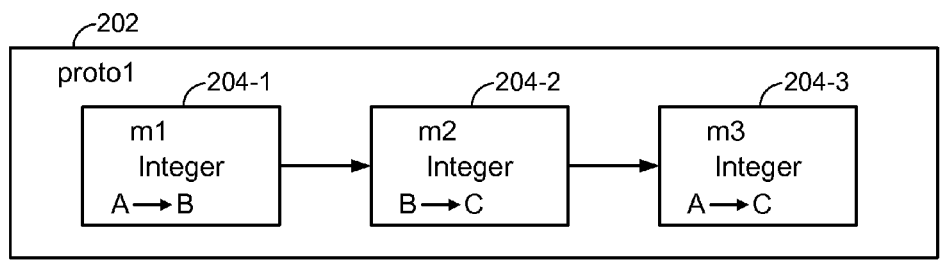
FIG. 2 shows the Interaction Protocol among multiple participating computers (A, B, C) in example embodiment 1.

In contrast, FIG. 2 uses an Interaction Protocol 202, "proto1", to describe the same interactions as shown in FIG. 1B. In the "proto1" Interaction Protocols "m1", "m2" and "m3" represent the message exchanges as shown in FIG. 1B between participating computers 104. Using the style of FIG. 2, even if there are a large number of participating computers 104 with a lot of messages being exchanged among them, it is still clear and easily manageable using the style of FIG. 2.

In the "proto1" Interaction Protocol in FIG. 2, the 1st Interaction Activity 204-1 specifies that participating computer A sends a "m1" message, which is an Integer, to participating computer B; the second Interaction Activity 204-2 specifies that participating computer B sends a "m2" message, which is an Integer, to participating computer C; the 3rd Interaction Activity 204-3 specifies that participating computer A sends a "m3" message, which is an Integer, to participating computer C.

Figure 3:
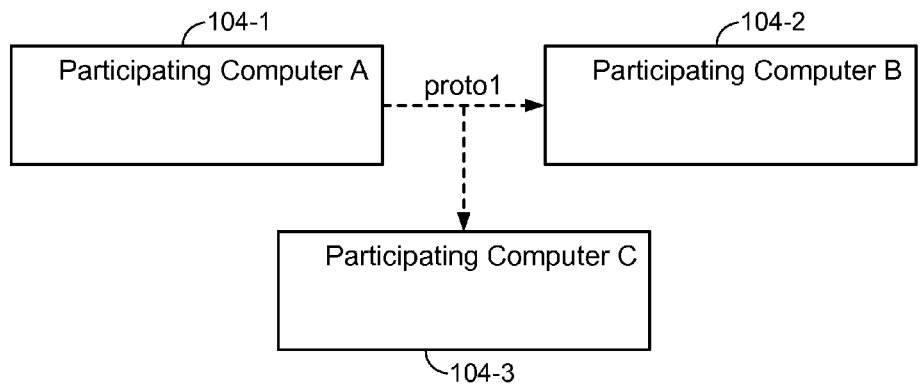
FIG. 3 shows that interactions among multiple participating computers (A, B, C) in example embodiment 1 is based on the "proto1" Interaction Protocol.

FIG. 3 shows how to use the "proto" Interaction Protocol to specify three participating computers A, B and C interacting with each other as described in FIG. 1B.

Figure 4:
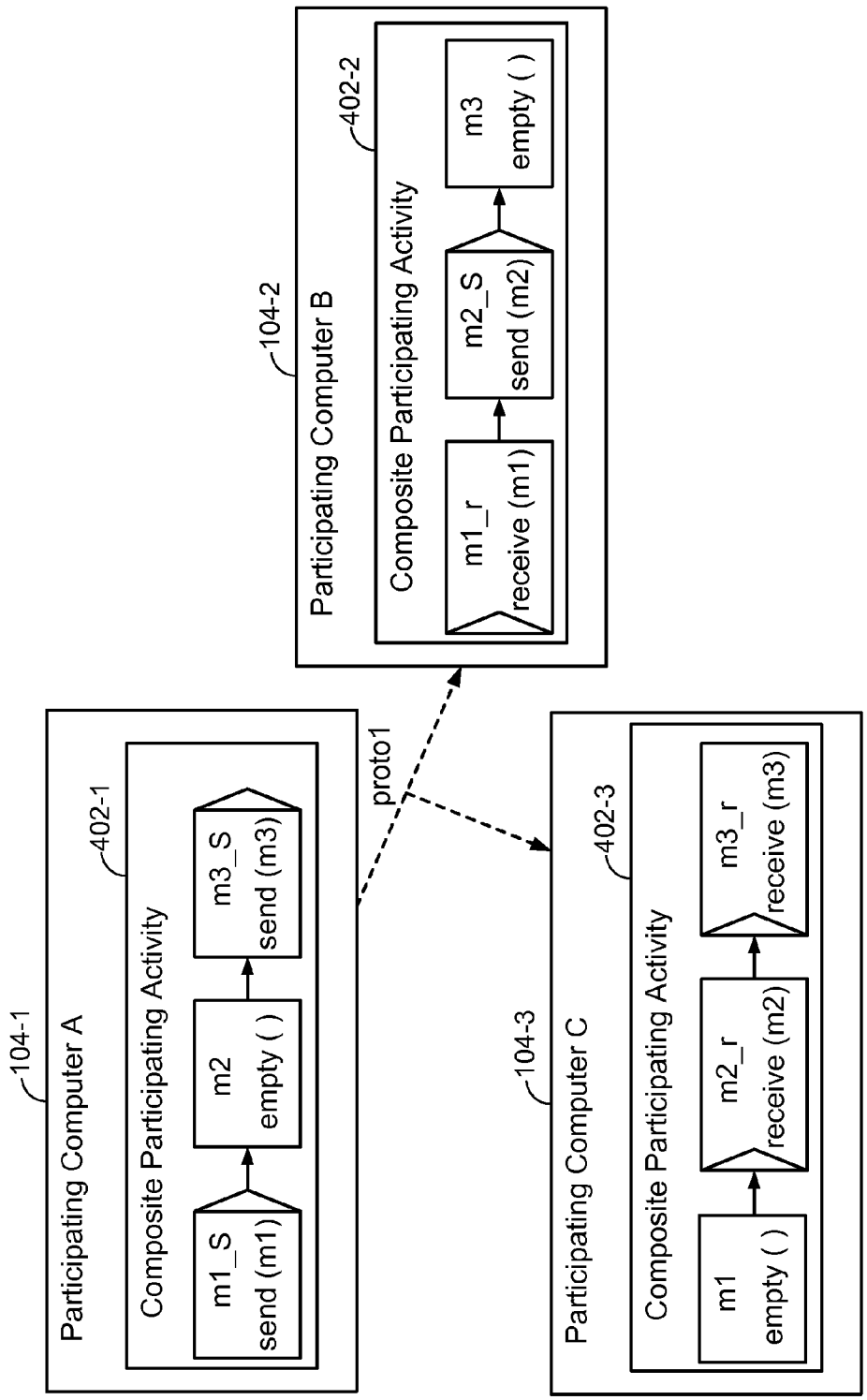
FIG. 4 shows the resulting interaction skeleton in participating computers in example embodiment 1 based on the "proto1" Interaction Protocol using the method described here.

Using FIG. 2 and FIG. 3, the method described here automatically generates interaction skeletons in participating computers 104 based on the "proto1" Interaction Protocol. The interaction skeleton in participating computers A, B and C can be generated as shown in FIG. 4. At 402-1, the interaction skeleton includes a Composite Participating Activity, which contains "m1_s", which is a Sending Participating Activity that is generated from the "m1" message in the "proto1" Interaction Protocol, "m2", which is an empty activity that is generated from the "m2" message in the "proto1" Interaction Protocol, and "m3_s", which is a Sending Participating Activity that is generated from the "m3" message in the "proto1" Interaction Protocol. At 402-2, the interaction skeleton includes a Composite Participating Activity, which contains "m1_r", which is a Receiving Participating Activity that is generated from the "m1" message in the "proto1" Interaction Protocol, "m2_s", which is a Sending Participating Activity that is generated from the "m2" message in the "proto1" Interaction Protocol, and "m3", which is an empty activity that is generated from the "m3" message in the "proto1" Interaction Protocol. At 402-3, the interaction skeleton includes a Composite Participating Activity, which contains "m1", which is an empty activity that is generated from the "m1" message in the "proto1" Interaction Protocol, "m2_r", which is a Receiving Participating Activity that is generated from the "m2" message in the "proto1" Interaction Protocol, and "m3_r", which is a Receiving Participating Activity that is generated from the "m3" message in the "proto1" Interaction Protocol.

Figure 5:
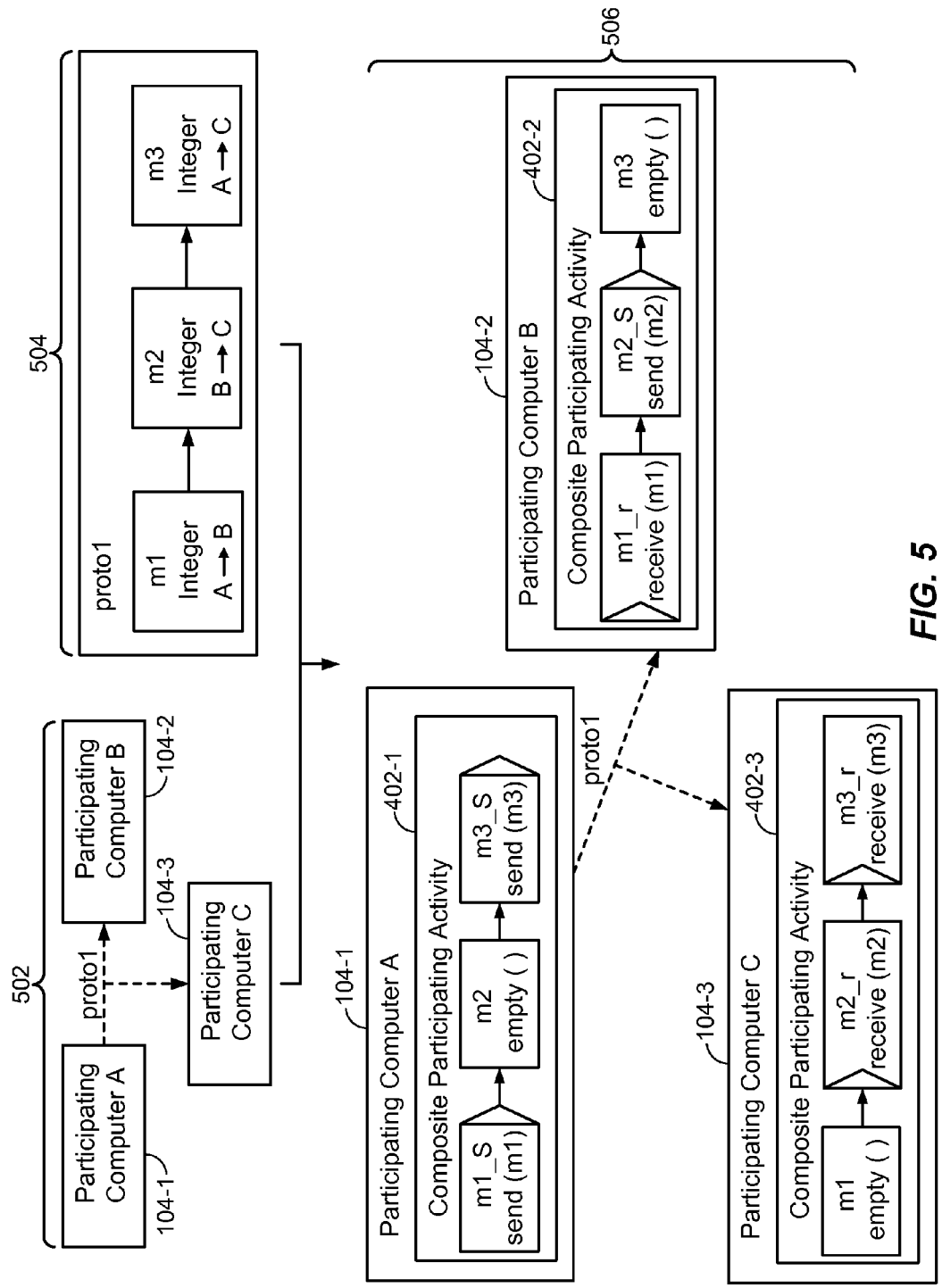
FIG. 5 shows the process of generating interaction skeleton in participating computers in example embodiment 1 based on the "proto1" Interaction Protocol using the method described here.

FIG. 5 describes that three participating computers A, B and C that interact with each other based on the "proto1" Interaction Protocol and those specific Interaction Activities and Transition Relations among them. Then, generator 108 can generate the interaction skeletons in participating computers A, B and C.

Using the method described here on example embodiment 1, the specific steps of the first round are described below. At 502, the "proto" Interaction Protocol specifies three participating computers A, B and C interacting with each other.

In step 1 at 504, editor1 106-1 creates the "proto1" Interaction Protocol based on the interaction process of how Participating computers A, B and C interact with each other at 502. The "proto1" Interaction Protocol is defined as a Composite Interaction Activity, which contains simple Interaction Activities, m1, m2 and m3, and multiple Transition Relations to completely describe the interaction process among participating computers 104, A, B and C.

At 506, in a step 2, generator 108 generates multiple Participating Activities and their Transition Relations in each participating computers A, B and C based on corresponding the Composite Interaction Activity, which contains simple Interaction Activities, m1, m2 and m3, in the "proto1" Interaction Protocol at 504.

Using participating computer A as an example, corresponding Participating Activities in participating computer A are generated based on the Composite Interaction Activity, which contains simple Interaction Activities, m1, m2 and m3, in the "proto1" Interaction Protocol. Specifically, generator 108 finds an Interaction Activity in the Interaction Protocol that has not been processed yet and performs the following steps.

In a step 2.1, generator 108 finds the first Interaction Activity, which is "proto1", and makes "proto1" the Current Activity. In step 2.3, generator 108 finds the next Interaction Activity, which is "m1", and makes "m1" the Current Activity. In step 2.3 of the next round, generator 108 finds the next Interaction Activity, which is "m2", and makes "m2" the Current Activity. In the next round, generator 108 finds the next Interaction Activity, which is "m3", and makes "m3" the Current Activity.

In a step 2.2, generator 108 generates a Participating Activity based on the type of the Current Activity and the role the participating computer 104 plays in the Current Activity. For example, when the Current Activity is a Composite Interaction Activity, generator 108 generates a Composite Participating Activity for the participating computer A at 402-1. When the Current Activity is a Simple Interaction Activity, and the participating computer 104-1 is a message sending party in the Current Activity, generator 108 generates a Sending Participating Activity, "m1_s", for the participating computer A. Else, if the participating computer 104-2 is a message receiving party in the Current Activity, generator 108 generates a Receiving Participating Activity, "m1_r", for the participating computer B. Else, the participating computer 104-3 is not involved in the Current Activity, generator 108 generates an empty Participating Activity, "m1", for the participating computer C.

Figure 6:
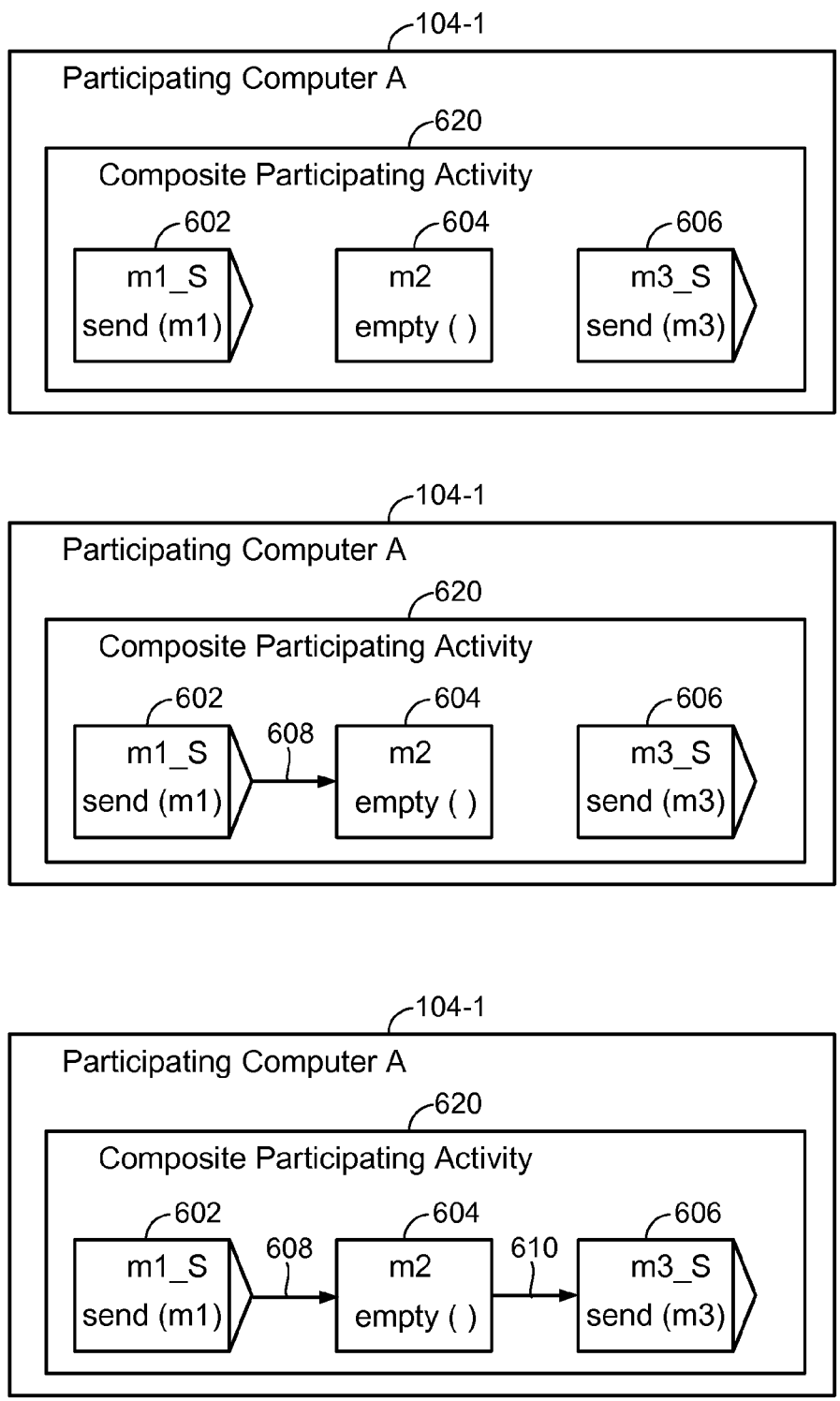
FIG. 6 shows steps when creating Transition Relation in participating computer A in example embodiment 1.

FIG. 6 shows an example how all Participating Activities in the Interaction Skeleton for the participating computer A is generated based on the method described here. As shown in FIG. 6, when the Current Activity is a Composite Interaction Activity, such as "proto1" at 504, generator 108 generates a Composite Participating Activity at 620.

As shown in FIG. 6, when the Current Activity is a Simple Interaction Activity, since participating computer A sends out a message in Interaction Activity "m1", a sending Participating Activity, "m1_s", is generated for participating computer A at 602. If the current Interaction Activity is "m2", since participating computer A is not involved, an empty Activity, "m2", is generated for participating computer A at 604. If the current Activity is "m3", since participating computer A sends out a message, a Sending Participating Activity, "m3_s", is generated for participating computer A at 606.

There may be two ways to generate Transition Relations in a Composite Participating Activity: one is to generate all subordinate Participating Activities (namely "m1_s", "m2", "m3_s") in the Composite Participating Activity for participating computer A as shown in 620 in FIG. 6 and then generate Transition Relations among them. For example, generator 108 generates a Transition Relation from "m1_s" to "m2" at 608 and then generator 108 generates a Transition Relation from "m2" to "m3_s" at 610.

The other way is to generate a Participating Activity ("m1_s") and its Transition Relations (namely the Transition Relation from "m1_s" to "m2") simultaneously, if one target activity (such as "m2") has not been generated yet, that Transition Relation (from "m1_s" to "m2") is delayed until the target Activity, "m2", is generated and then generate that Transition Relation (from "m1_s" to "m2").

In a step 2.3, generator 108 finds the next Interaction Activity that has not been processed yet. In this example, generator 108 finds "m1" in the first round, and "m2" and then "m3" will be found when step 2.3 is executed in subsequent rounds. Hence, the "m1" Interaction Activity becomes the Current Activity this round, and "m2" and then "m3" will become the Current Activity in subsequent rounds, and generator 108 performs step 2.2 each time. When no more unprocessed Interaction Activity can be found, all corresponding Participating Activities must have been generated.

When step 2.2 is executed in the first round, the "m1" Interaction Activity becomes the current Activity. Since participating computer A sends out a message in the "m1" Interaction Activity, a Sending Participating Activity, "m1_s", is generated in participating computer A at 602.

When step 2.2 is executed in the next round, the "m2" Interaction Activity becomes the current Activity. Since participating computer A is not involved in the "m2" Interaction Activity, an empty "m2" Activity is generated in participating computer A at 604.

When step 2.2 is executed in the next round, the "m3" Interaction Activity becomes the current Activity. Since participating computer A sends out a message in the "m3" Interaction Activity, a Sending Participating Activity, "m3_s", is generated in participating computer A at 606.

Following above steps, the interaction skeletons in participating computers A, B and C can be automatically generated based on the "proto1" Interaction Protocol as shown in FIG. 4.

Figure 7:
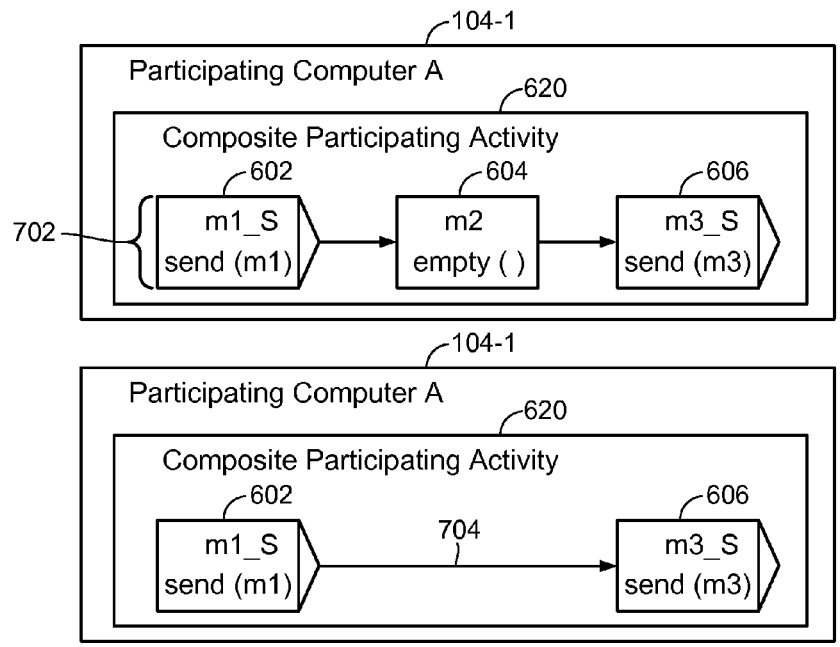
FIG. 7 shows how empty Participating Activity in participating computer A in example embodiment 1 is simplified using the method described here.
Figure 8:
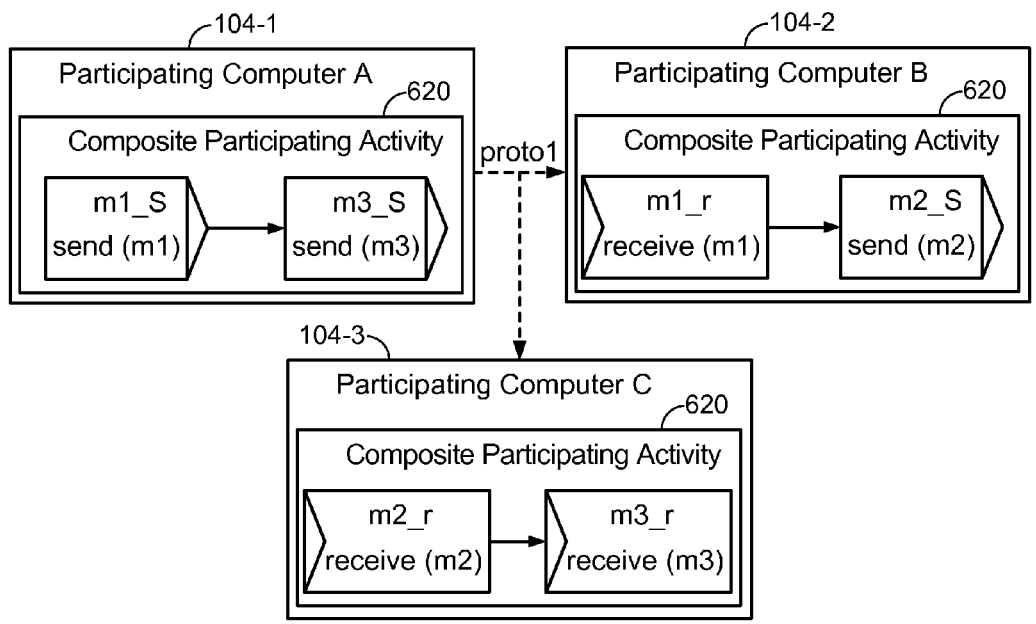
FIG. 8 shows the resulting interaction skeleton after simplification of empty activities in participating systems in example embodiment 1 based on the "proto1" Interaction Protocol using the method described here.

In addition, particular embodiments can further simplify empty activities as shown in FIG. 7. Using participating computer A as an example, following the method described here, all Participating Activities (namely "m1_s", "m2", and "m3_s") and their Transition Relations (namely the Transition Relation from "m1_s" to "m2" and Transition Relation from "m2" to "m3_s") are generated in participating computer A. Then, generator 108 can traverse each Participating Activity (namely "m1_s", "m2", and "m3_s") at 702 for participating computer A to find an empty Activity to simplify. Because "m2" is an empty activity, a Participating Activity ("m1_s") with "m2" as its target needs to have its Transition Relation re-generated using the target (namely "m3_s") of the empty activity as the target for the newly generated Transition Relation for participating computer A. Hence, Transition Relation from "m1_s" to "m3_s" is re-generated as shown at 704. Finally, the "m2" empty activity is removed to get the result of this simplification. Following the same way, any empty activity for participating computer 104 B and C can be simplified. FIG. 8 shows the simplified interaction skeletons in participating computers A, B and C after the empty Activities have been removed.

Example Embodiment 2

Figure 11:
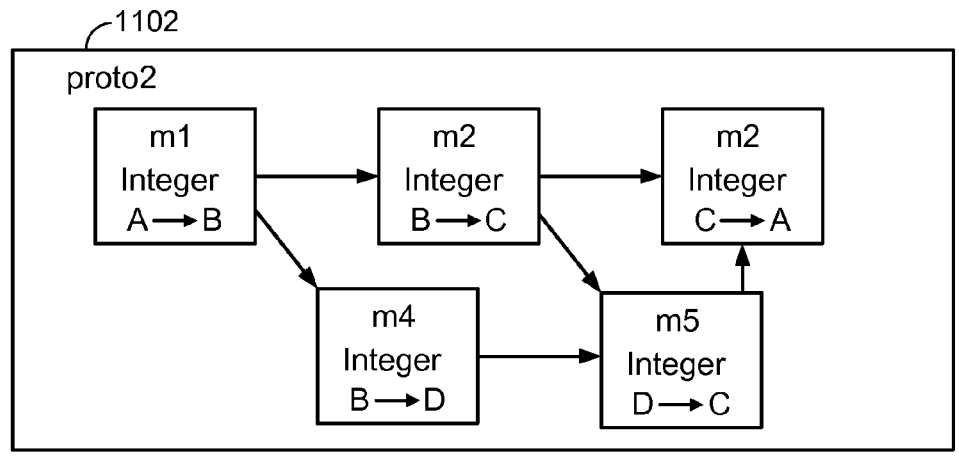
FIG. 11 is the Proto12 Interaction Protocol in example embodiment 2.

As shown in FIG. 11, "proto2" at 1102 describes interactions among four participating computers 104 (A, B, C and D). Interaction skeletons in participating computers A, B, C and D can be automatically generated using the method described here. Specific steps are the same as shown in example embodiment 1. For brevity, these specific steps are not repeated here.

Example Embodiment 3

Figure 12:
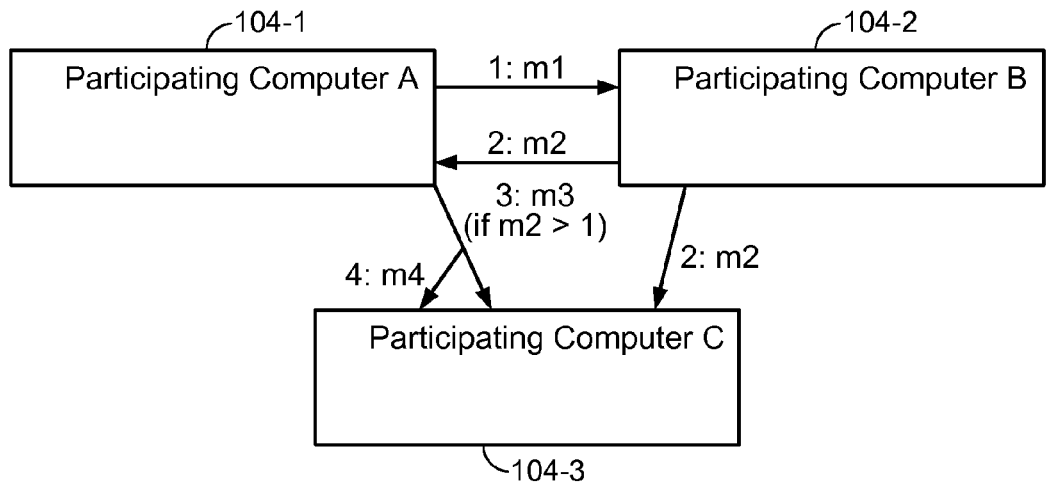
FIG. 12 shows interactions among multiple participating computers (A, B, C) in example embodiment 3.

As shown in FIG. 12, three participating computers A, B and C interact with each other. Firstly, participating computer A sends a "m1" message to participating computer B; secondly, after participating computer B receives "m1", participating computer B sends a "m2" message to participating computer A and a "m2" message to participating computer C; and then if m2 is larger than 1, participating computer A sends a "m3" message to participating computer C; else, participating computer A sends a "m4" message to participating computer C.

Figure 13:
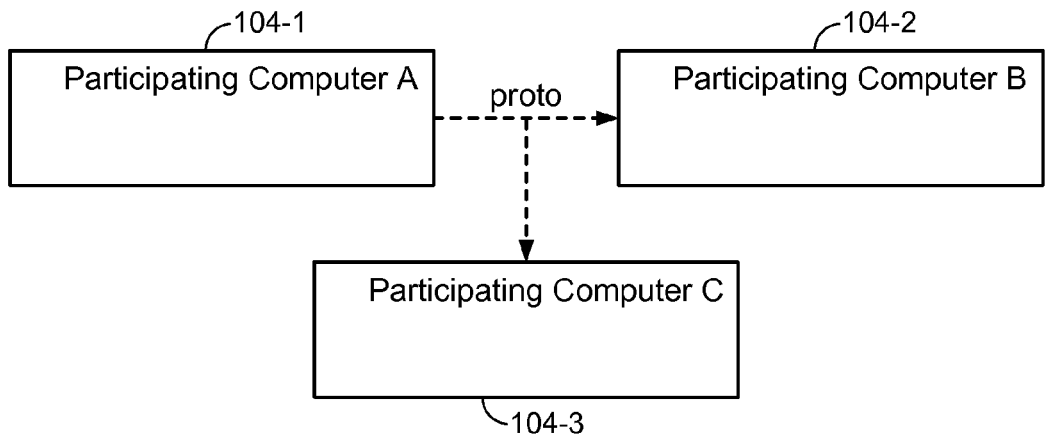
FIG. 13 shows multiple participating computers (A, B, C) in example embodiment 3 interact with each other based on the "proto" Interaction Protocol.
Figure 14:
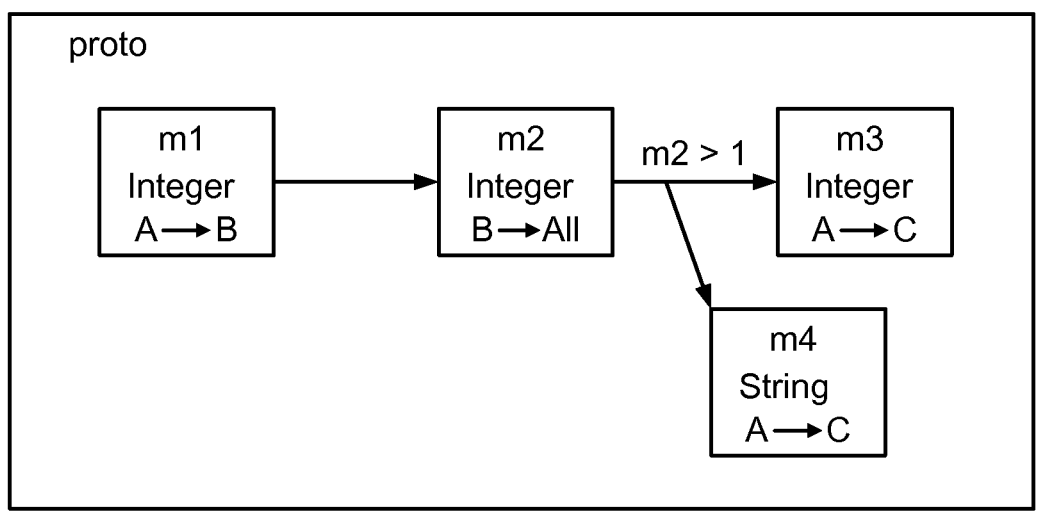
FIG. 14 shows the definition of the "proto" Interaction Protocol in example embodiment 3.

FIG. 13 in this example embodiment shows that multiple participating computers 104 (A, B and C) interact with each other and their interactions are defined in the "proto" Interaction Protocol as shown in FIG. 14. The difference between this embodiment and example embodiment 1 is that the Transition Relation from "m2" to "m3" and "m4" has a Transition Condition predicate, which describes that if "m2" is larger than 1, participating computer A sends a "m3" message to participating computer C; else, participating computer A sends a "m4" message to participating computer C. Therefore, when generating corresponding Transition Relations for each participating computers 104, this Transition Condition predicate needs to be specified.

Figure 15:
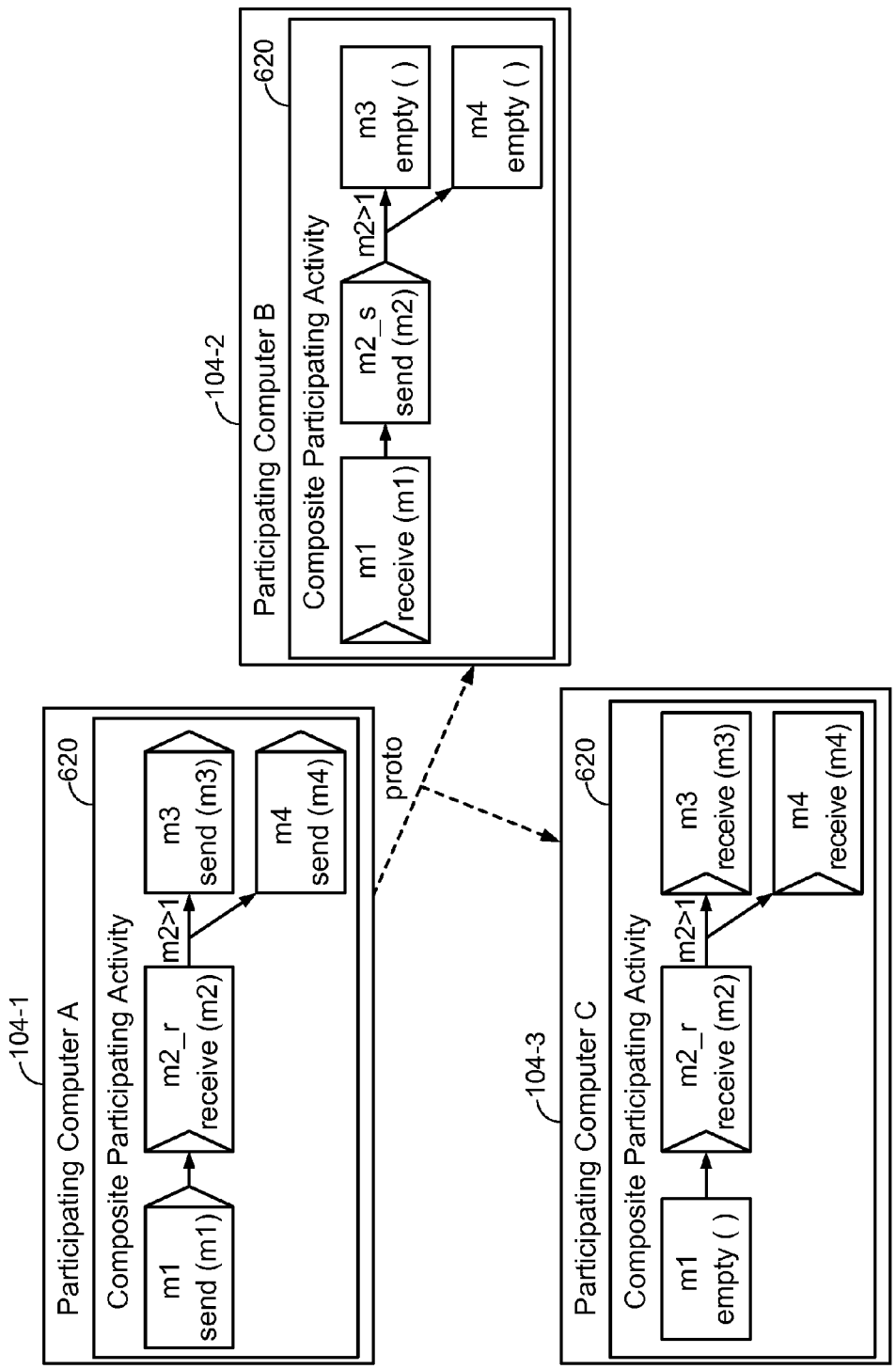
FIG. 15 shows the generated interaction skeleton before empty Activities are simplified in participating systems in example embodiment 3 based on the "proto" Interaction Protocol.
Figure 16:
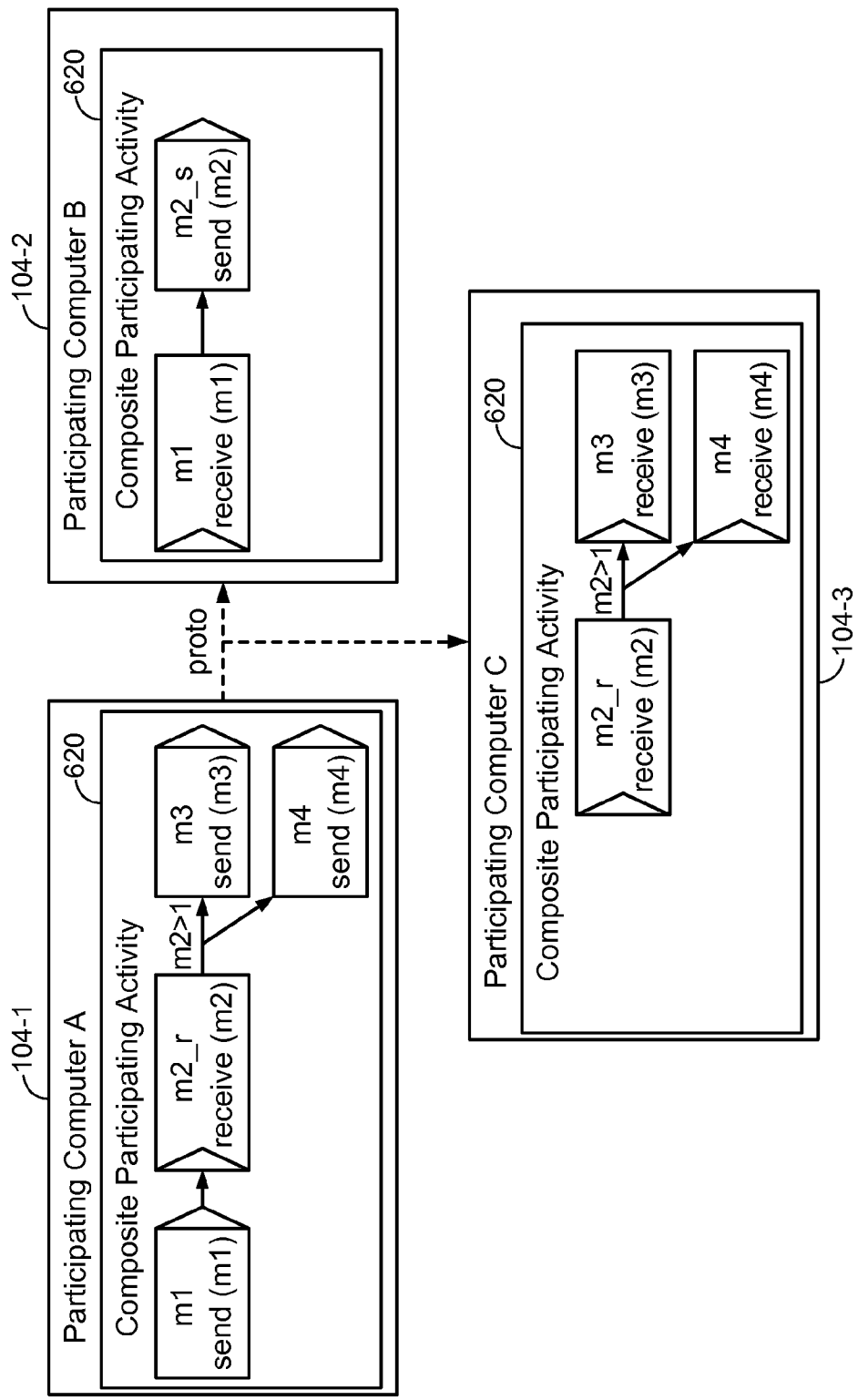
FIG. 16 shows the resulting interaction skeleton after empty Activities are simplified in participating systems in example embodiment 3 based on the "proto" Interaction Protocol.

Based on the "proto" Interaction Protocol in FIG. 14, interaction skeletons in participating computers A, B, and C can be automatically generated using the method described here. FIG. 15 shows interaction skeletons in participating computers A, B, and C generated using the method described here before any empty activity is simplified. FIG. 16 shows interaction skeletons in participating computers A, B, and C generated using the method described here after all empty activities has been simplified. The Specific steps are the same as shown in example embodiment 1. For brevity, these specific steps are not repeated here.

Particular embodiments provide the method described here to automatically generate interaction skeletons in each participating computer 104 based on the definition of a multi-party Interaction Protocol. Developers or users can further add internal or other activities in each participating computer 104 to complete the software development.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for generating interaction skeletons for a plurality of participating computers to inter-operate based on a multi-party interaction protocol, the method comprising:
   creating an Interaction Protocol based on an interaction process of how the plurality of participating computers interact with each other, wherein the Interaction Protocol uses multiple Interaction Activities and multiple Transition Relations to describe the interaction process among the plurality of participating computers;
   determining an interaction skeleton by generating a plurality of Participating Activities and their Transition Relations for each participating computer in the plurality of participating computers based on corresponding Interaction Activities and their Transition Relations in the Interaction Protocol,
   wherein the plurality of Participating Activities are generated by performing:
      determining an Interaction Activity to make the Interaction Activity a current Interaction Activity;
      generating a Participating Activity based on a type of the current Interaction Activity and a role a participating computer plays in the current Interaction Activity by analyzing corresponding Interaction Activities in the Interaction Protocol; and
      performing the determining the Interaction Activity and generating of the participating activity for each Interaction Activity until all interaction activities are processed to generate the interaction skeleton,
   wherein:
      the current Interaction Activity describes one or more interactions in between two or more participating computers,
      the current Interaction Activity comprises a Simple Interaction Activity, and
      the Simple Interaction Activity describes a message exchange in between the two or more participating computers,
   wherein generating the Participating Activity comprises:
      when the current Interaction Activity is the Simple Interaction Activity, performing:
         when the participating computer is a message sending party in the current Interaction Activity, generating a Sending Participating Activity for the participating computer;
         when the participating computer is a message receiving party in the current Interaction Activity, generating a Receiving Participating Activity for the participating computer; and
         when the participating computer is not involved in the current Interaction Activity, generating an empty Participating Activity for the participating computer; and
   converting the interaction skeleton into executable interaction modules, wherein one of the interaction modules is loaded into each participating computer in the plurality of participating computers, and wherein the plurality of participating computers use the interaction module to communicate messages.

2. The method of claim 1, wherein the interaction skeleton includes non-executable code and the interaction modules include executable code.

3. The method of claim 1, wherein generating the plurality of Participating Activities and their Transition Relations comprises:
   generating all Participating Activities in the plurality of participating computers; and
   generating the Transition Relations among the Participating Activities.

4. The method of claim 1, wherein:
   the current Interaction Activity describes one or more interactions in between two or more participating computers,
   the Interaction Activity comprises a Composite Interaction Activity, and
   the Composite Interaction Activity contains two or more subordinate Simple Interaction Activities or Composite Interaction Activities, and Transition Relations between them.

5. The method of claim 4, wherein generating the Participating Activity comprises:
   when the current Interaction Activity is a Composite Interaction Activity, generating a Composite Participating Activity.

6. The method of claim 1, wherein the Transition Relation includes a source activity, a target activity, and the Transition Relation includes an associated predicate that specifies a condition when the target activity is to become the next to start, wherein the source activity and the target activity are either the Interaction Activity or the Participating Activity.

7. The method of claim 6, wherein the interaction skeleton is simplified by removing each empty Participating Activity, wherein removing comprises:
   when the Participating Activity is empty, deleting the empty Participating Activity and all its Transition Relations, and then adding a new Transition Relation linking from each source activity of the deleted empty Participating Activity to all target activities of the deleted empty Participating Activity.

8. The method of claim 6, wherein generating the plurality of Participating Activities and their Transition Relations comprises:
   generating a Participating Activity and its Transition Relations simultaneously;
   if one target Participating Activity of one Transition Relation has not been generated yet, delaying generation of that Transition Relation until the target Participating Activity is generated.

9. A non-transitory computer-readable storage medium containing instructions for generating interaction skeletons for a plurality of participating computers to inter-operate based on a multi-party interaction protocol, wherein the instructions, when executed, control a computer system to be configured for:

creating an Interaction Protocol based on an interaction process of how the plurality of participating computers interact with each other, wherein the Interaction Protocol uses multiple Interaction Activities and multiple Transition Relations to describe the interaction process among the plurality of participating computers;

determining an interaction skeleton by generating a plurality of Participating Activities and their Transition Relations for each participating computer in the plurality of participating computers based on corresponding Interaction Activities and their Transition Relations in the Interaction Protocol, wherein the plurality of Participating Activities are generated by performing:

determining an Interaction Activity to make the Interaction Activity a current Interaction Activity;

generating a Participating Activity based on a type of the current Interaction Activity and a role a participating computer plays in the current Interaction Activity by analyzing corresponding Interaction Activities in the Interaction Protocol; and performing the determining the Interaction Activity and generating of the participating activity for each Interaction Activity until all interaction activities are processed to generate the interaction skeleton, wherein:

the current Interaction Activity describes one or more interactions in between two or more participating computers, the current Interaction Activity comprises a Simple Interaction Activity, and the Simple Interaction Activity describes a message exchange in between the two or more participating computers, wherein generating the Participating Activity comprises:

when the current Interaction Activity is the Simple Interaction Activity, performing:

when the participating computer is a message sending party in the current Interaction Activity, generating a Sending Participating Activity for the participating computer;

when the participating computer is a message receiving party in the current Interaction Activity, generating a Receiving Participating Activity for the participating computer; and when the participating computer is not involved in the current Interaction Activity, generating an empty Participating Activity for the participating computer; and converting the interaction skeleton into executable interaction modules, wherein one of the interaction modules is loaded into each participating computer in the plurality of participating computers, and wherein the plurality of participating computers use the interaction module to communicate messages.

10. The non-transitory computer-readable storage medium of claim 9, wherein the interaction skeleton includes non-executable code and the interaction modules include executable code.

11. The non-transitory computer-readable storage medium of claim 9, wherein generating the plurality of Participating Activities and their Transition Relations comprises:

generating all Participating Activities in the plurality of participating computers; and generating the Transition Relations among the Participating Activities.

12. The non-transitory computer-readable storage medium of claim 9, wherein:

the current Interaction Activity describes one or more interactions in between two or more participating computers, the current Interaction Activity comprises a Composite Interaction Activity, and the Composite Interaction Activity contains two or more subordinate Simple Interaction Activities or Composite Interaction Activities, and Transition Relations between them.

13. The non-transitory computer-readable storage medium of claim 12, wherein generating the Participating Activity comprises:

when the current Interaction Activity is a Composite Interaction Activity, generating a Composite Participating Activity.

14. The non-transitory computer-readable storage medium of claim 9, wherein the Transition Relation includes a source activity, a target activity, and the Transition Relation includes an associated predicate that specifies a condition when the target activity is to become the next to start, wherein the source activity and the target activity are either the Interaction Activity or the Participating Activity.

15. The non-transitory computer-readable storage medium of claim 14, wherein the interaction skeleton is simplified by removing each empty Participating Activity, wherein removing comprises:

when the Participating Activity is empty, deleting the empty Participating Activity and all its Transition Relations, and then adding a new Transition Relation linking from each source activity of the deleted empty Participating Activity to all target activities of the deleted empty Participating Activity.

16. The non-transitory computer-readable storage medium of claim 14, wherein generating the plurality of Participating Activities and their Transition Relations comprises:

generating a Participating Activity and its Transition Relations simultaneously;

if one target Participating Activity of one Transition Relation has not been generated yet, delaying generation of that Transition Relation until the target Participating Activity is generated; and generating that Transition Relation when the target Participating Activity is generated.

17. An apparatus for generating interaction skeletons for a plurality of participating computers to inter-operate based on a multi-party interaction protocol, the apparatus comprising:

one or more computer processors; and a non-transitory computer-readable storage medium comprising instructions, that when executed, control the one or more computer processors to be configured for:

creating an Interaction Protocol based on an interaction process of how the plurality of participating computers interact with each other, wherein the Interaction Protocol uses multiple Interaction Activities and multiple Transition Relations to describe the interaction process among the plurality of participating computers;

determining an interaction skeleton by generating a plurality of Participating Activities and their Transition Relations for each participating computer in the plurality of participating computers based on corresponding Interaction Activities and their Transition Relations in the Interaction Protocol, wherein the plurality of Participating Activities are generated by performing:

determining an Interaction Activity to make the Interaction Activity a current Interaction Activity;

generating a Participating Activity based on a type of the current Interaction Activity and a role a participating computer plays in the current Interaction Activity by analyzing corresponding Interaction Activities in the Interaction Protocol; and performing the determining the Interaction Activity and generating of the participating activity for each Interaction Activity until all interaction activities are processed to generate the interaction skeleton, wherein:

the current Interaction Activity describes one or more interactions in between two or more participating computers, the current Interaction Activity comprises a Simple Interaction Activity, and the Simple Interaction Activity describes a message exchange in between the two or more participating computers, wherein generating the Participating Activity comprises:

when the current Interaction Activity is the Simple Interaction Activity, performing:

when the participating computer is a message sending party in the current Interaction Activity, generating a Sending Participating Activity for the participating computer;

when the participating computer is a message receiving party in the current Interaction Activity, generating a Receiving Participating Activity for the participating computer; and when the participating computer is not involved in the current Interaction Activity, generating an empty Participating Activity for the participating computer; and converting the interaction skeleton into executable interaction modules, wherein one of the interaction modules is loaded into each participating computer in the plurality of participating computers, and wherein the plurality of participating computers use the interaction module to communicate messages.

18. The apparatus of claim 17, wherein the interaction skeleton includes non-executable code and the interaction modules include executable code.

19. The apparatus of claim 17, wherein generating the plurality of Participating Activities and their Transition Relations comprises:

generating all Participating Activities in the plurality of participating computers; and generating the Transition Relations among the Participating Activities.

20. The apparatus of claim 17, wherein:

the current Interaction Activity describes one or more interactions in between two or more participating computers, the current Interaction Activity comprises a Composite Interaction Activity, and the Composite Interaction Activity contains two or more subordinate Simple Interaction Activities or Composite Interaction Activities, and Transition Relations between them.

21. The apparatus of claim 20, wherein generating the Participating Activity comprises:

when the current Interaction Activity is a Composite Interaction Activity, generating a Composite Participating Activity.

22. The apparatus of claim 17, wherein the Transition Relation includes a source activity, a target activity, and the Transition Relation includes an associated predicate that specifies a condition when the target activity is to become the next to start, wherein the source activity and the target activity are either the Interaction Activity or the Participating Activity.

23. The apparatus of claim 22, wherein the interaction skeleton is simplified by removing each empty Participating Activity, wherein removing comprises:

when the Participating Activity is empty, deleting the empty Participating Activity and all its Transition Relations, and then adding a new Transition Relation linking from each source activity of the deleted empty Participating Activity to all target activities of the deleted empty Participating Activity.

* * * * *